(12) United States Patent
Little et al.

(10) Patent No.: US 8,213,802 B2
(45) Date of Patent: Jul. 3, 2012

(54) RECEIVER ON A PHOTONIC IC

(75) Inventors: Brent E. Little, Glen Head, NY (US); Wei Chen, Ellicott City, MD (US); John V. Hryniewicz, Columbia, MD (US); Sai T. Chu, Columbia, MD (US); Jeff Rahn, Sunnyvale, CA (US); Mehrdad Ziari, Pleasanton, CA (US); Timothy Butrie, Orefield, PA (US); Michael Reffle, Center Valley, PA (US); Fred A. Kish, Jr., Palo Alto, CA (US); Charles H. Joyner, Sunnyvale, CA (US)

(73) Assignee: Infinera Corporation, Sunnyvale, CA (US)

( * ) Notice: Subject to any disclaimer, the term of this patent is extended or adjusted under 35 U.S.C. 154(b) by 602 days.

(21) Appl. No.: 12/345,817

(22) Filed: Dec. 30, 2008

(65) Prior Publication Data

US 2009/0245801 A1 Oct. 1, 2009

Related U.S. Application Data

(60) Provisional application No. 61/030,782, filed on Feb. 22, 2008.

(51) Int. Cl.
*H04B 10/06* (2006.01)
(52) U.S. Cl. .......................... 398/121; 398/207; 398/214
(58) Field of Classification Search ........... 398/205–214
See application file for complete search history.

(56) References Cited

U.S. PATENT DOCUMENTS

| 7,259,901 | B2 | 8/2007 | Parsons et al. |
| 7,394,953 | B1* | 7/2008 | Nagarajan et al. ............... 385/37 |
| 2003/0002798 | A1 | 1/2003 | Hatayama et al. |
| 2004/0033004 | A1 | 2/2004 | Welch et al. |
| 2006/0165341 | A1* | 7/2006 | Yan et al. ........................ 385/8 |
| 2007/0230625 | A1* | 10/2007 | Hironishi et al. ............... 375/329 |
| 2008/0044131 | A1* | 2/2008 | Yan et al. ........................ 385/16 |
| 2008/0181271 | A1* | 7/2008 | Hattori ........................ 372/38.01 |
| 2009/0148171 | A1* | 6/2009 | Chen et al. ..................... 398/208 |

OTHER PUBLICATIONS

Pieper, Thomas, 'International Search Report,' Feb. 2009, European Patent Office, Rijswijk.
Pieper, Thomas, 'Written Opinion of the International Search Authority (PCT Rule 43bis.1),' Feb. 2009, European Patent Office, Rijswijk.

(Continued)

*Primary Examiner* — Dzung Tran
(74) *Attorney, Agent, or Firm* — Duane Morris LLP; David L. Soltz

(57) ABSTRACT

An optical receiver includes a first substrate including a demultiplexer and a first optical waveguide array. An input of the demultiplexer is configured to receive a wavelength division multiplexed optical input signal having a plurality of channels. Each of the plurality of channels corresponds to one of a plurality of wavelengths. Each of the plurality of outputs is configured to supply a corresponding one of the plurality of channels. The first optical waveguide array has a plurality of inputs. Each of the inputs of the first optical waveguide array is configured to receive a corresponding one of the plurality of channels. A second substrate is in signal communication with the first substrate and includes an optical detector array. The optical detector array has a plurality of inputs, each of which is configured to receive a corresponding one of the plurality of channels and generate an electrical signal in response thereto.

37 Claims, 7 Drawing Sheets

OTHER PUBLICATIONS

Terui, H. et al., Novel Micro-Mirror Fabrication Technique for Silica-Based PLC and its Application to 24-ch WDM Photo-Receiver with AWG, Lasers and Electro-Optics Society (LEOS) Annual Meeting, Dec. 1998, pp. 311-312, vol. 1, 1, IEEE, Piscataway, New Jersey.

Suzuki, Kenya, "High Speed Optical 1×4 Switch Based on Generalized Mach-Zehnder Interferometer With Hybrid Configuration of Silica-Based PLC and Lithium Niobate Phase Shifter-Array," IEEE Photonics Technology Letters, May 2007, pp. 674-676, vol. 19, No. 9, IEEE Service Center, Piscataway, New Jersey.

Kawachi, M, 'Recent Progress in Silica-based Planar Lightwave Circuits on Silicon,' IEEE Proceedings: Optoelectronics, Institution of Electrical Engineers, Oct. 1996, pp. 257-262, vol. 143, No. 5.

Mizuno, T., et al, Wideband Planar Lightwave Circuit Type Variable Optical Attenuator Using Phase-Generating Coupler, Electronic Letters, May 2006, pp. 636-638, vol. 42, No. 11.

* cited by examiner

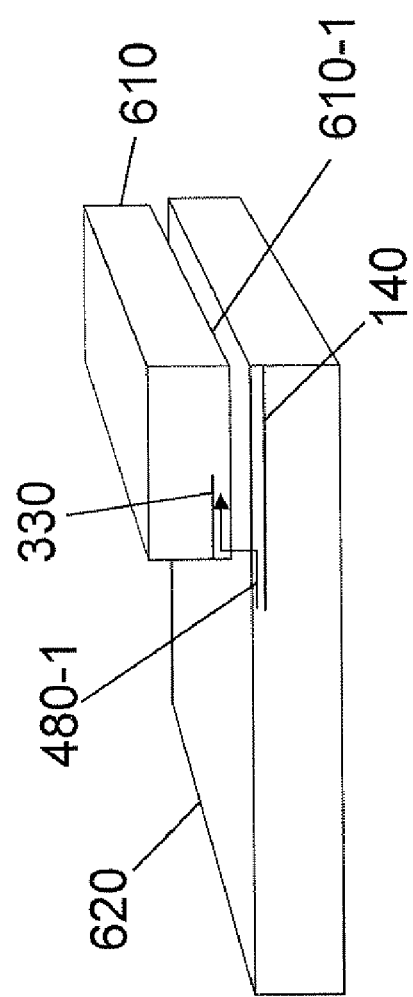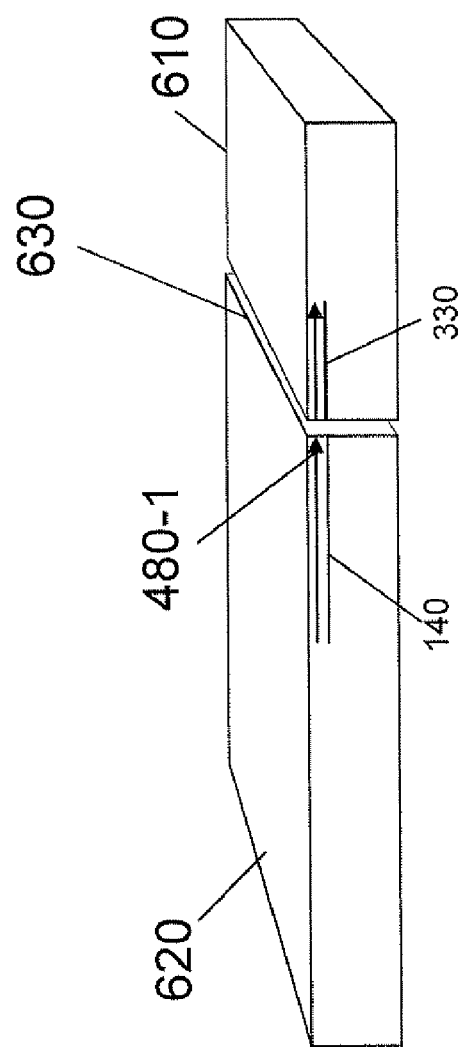
FIG. 4A
FIG. 4B

RECEIVER ON A PHOTONIC IC

CROSS-REFERENCE TO RELATED APPLICATIONS

This application claims priority to U.S. Provisional Application No. 61/030,782 filed Feb. 22, 2008 which is herein incorporated by reference in its entirety.

BACKGROUND

1. Field of the Invention

Embodiments of the invention relate to the field of optical communication devices. More particularly, the present invention relates to a receiver used for optical communication systems implemented on a planar lightwave circuit and a photonic integrated circuit.

2. Discussion of Related Art

Wavelength division multiplexed (WDM) optical communication systems are known in which multiple optical signals, each having a different wavelength, are combined onto a single optical fiber. Such systems typically include a laser associated with each wavelength, a modulator configured to modulate the output of the laser, and an optical combiner to combine each of the modulated outputs. Conventionally, WDM systems have been constructed from discrete components. For example, the lasers, modulators and combiners have been packaged separately and mounted on a printed circuit board. More recently, however, many WDM components including transmitters, receivers and passive devices have been integrated onto a single chip also referred to as a photonic integrated circuit (PIC).

Differential Quadrature Phase-Shift Keying (DQPSK) has been proposed as an optical signal modulation format capable of increasing the capacity of WDM fiber optic communication systems. On the receive side of such a communication system, the demodulation of DQPSK signals or other signals transmitted in accordance with a self-coherent scheme require a considerable amount of optical and electrical circuitry. Conventional receiver implementations require several planar lightwave circuits (PLCs) coupled together with each PLC including a component of the receiver. However, implementing an optical receiver requires tight tolerances to properly align the PLCs to avoid signal loss as the optical signal travels from one PLC to another. Additionally, implementing an optical receiver on several PLCs requires a large footprint for the optical circuit which not only requires the overall system to be larger, but also increases manufacturing costs. Accordingly, an improved optical receiver circuit is desirable.

SUMMARY

Exemplary embodiments of the present invention are directed to a high capacity optical receiver. In an exemplary embodiment, an optical receiver includes a first substrate including a demultiplexer and a first optical waveguide array. An input of the demultiplexer is configured to receive a wavelength division multiplexed optical input signal having a plurality of channels. Each of the plurality of channels corresponds to one of a plurality of wavelengths. Each of the plurality of outputs is configured to supply a corresponding one of the plurality of channels. The first optical waveguide array has a plurality of inputs. Each of the inputs of the first optical waveguide array is configured to receive a corresponding one of the plurality of channels. A second substrate is in signal communication with the first substrate and includes an optical detector array. The optical detector array has a plurality of inputs, each of which is configured to receive a corresponding one of the plurality of channels and generate an electrical signal in response thereto.

In another embodiment, an optical receiver includes a first substrate and a first planar lightwave circuit (PLC) formed on the first substrate. The PLC includes a demultiplexer and a first optical waveguide array. The demultiplexer is configured to receive a wave division multiplexed (WDM) optical input signal having a plurality of channels and supply a plurality of optical output signals. Each of the plurality of output signals corresponds to one of the plurality channels of the WDM optical input signal. Each of the plurality of channels corresponds to one of a plurality of wavelengths. The first optical waveguide array has a plurality of inputs and outputs. Each of the plurality of inputs of the first optical waveguide array is configured to receive at least an optical signal component of one of the plurality of channels. An optical detector array is disposed on a second substrate. The optical detector array includes a plurality of photodiodes. Each of the plurality of photodiodes is configured to receive an optical signal component from a respective waveguide of the first optical waveguide array and generate an electrical signal in response thereto.

BRIEF DESCRIPTION OF THE DRAWINGS

FIG. 4A illustrates an exemplary connection of a planar lightwave circuit and a photonic integrated circuit in accordance with the present disclosure.

FIG. 4B illustrates another exemplary interface connection of a planar lightwave circuit and a photonic integrated circuit in accordance with the present disclosure.

DETAILED DESCRIPTION

Figure 1:
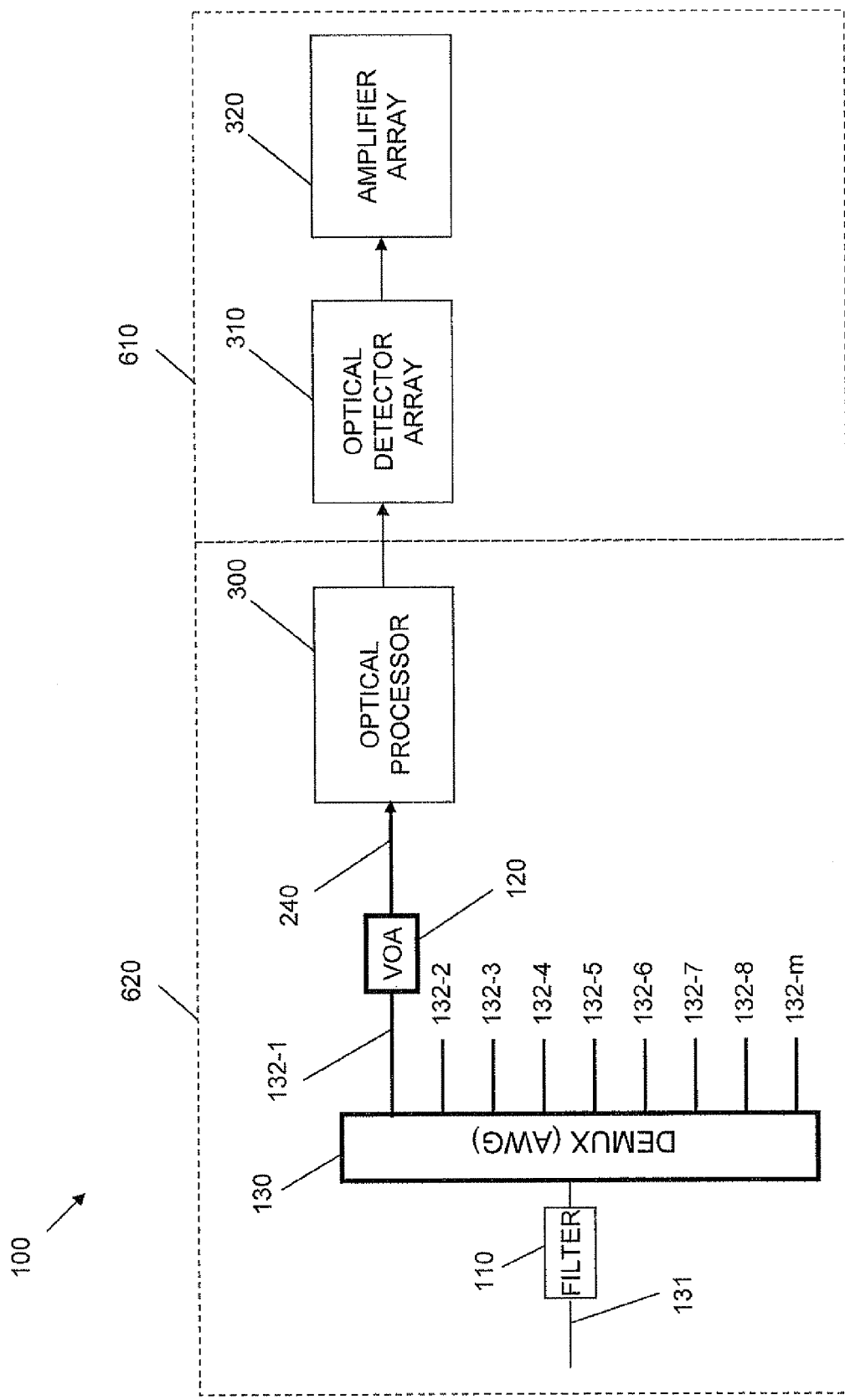
FIG. 1 illustrates exemplary components of an optical receiver in accordance with the present disclosure.

The present invention will now be described more fully hereinafter with reference to the accompanying drawings, in which preferred embodiments of the invention are shown. This invention, however, may be embodied in many different forms and should not be construed as limited to the embodiments set forth herein. Rather, these embodiments are provided so that this disclosure will be thorough and complete, and will fully convey the scope of the invention to those skilled in the art. It will be understood that when an element or component is referred to herein as being "connected" or "coupled" to another element, it can be directly connected or coupled to the other element or intervening elements may be present therebetween. In contrast, when an element is referred to as being "directly connected" or "directly coupled" to another element, there are no intervening elements present. In the drawings, like numbers refer to like elements throughout.

FIG. 1 illustrates a block diagram of an optical receiver 100 configured to receive and process a DQPSK input signal in accordance with an aspect of the present invention. Optical receiver 100 includes a demultiplexer (DEMUX) 130 having an input 131 and a plurality of outputs 132-1 to 132-m (hereinafter collectively referred to as "DEMUX outputs 132") formed on a first substrate 620. Each of the DEMUX outputs 132 may be connected to an optical processor 300 through a filter 110 and a variable optical attenuator 120 also formed on the first substrate 620. A first waveguide array 140 (see FIGS. 4A-4D) is connected to the one or more outputs of the optical processor 300. An optical detector array 310 is disposed on a second substrate 610 and is configured to receive optical signals from the first waveguide array 140. The optical detector array 310 is connected to an amplifier array 320, which may be disposed on the second substrate 610. In some implementations, the amplifier array 320 may be located on a third substrate (not shown).

Figure 1A:
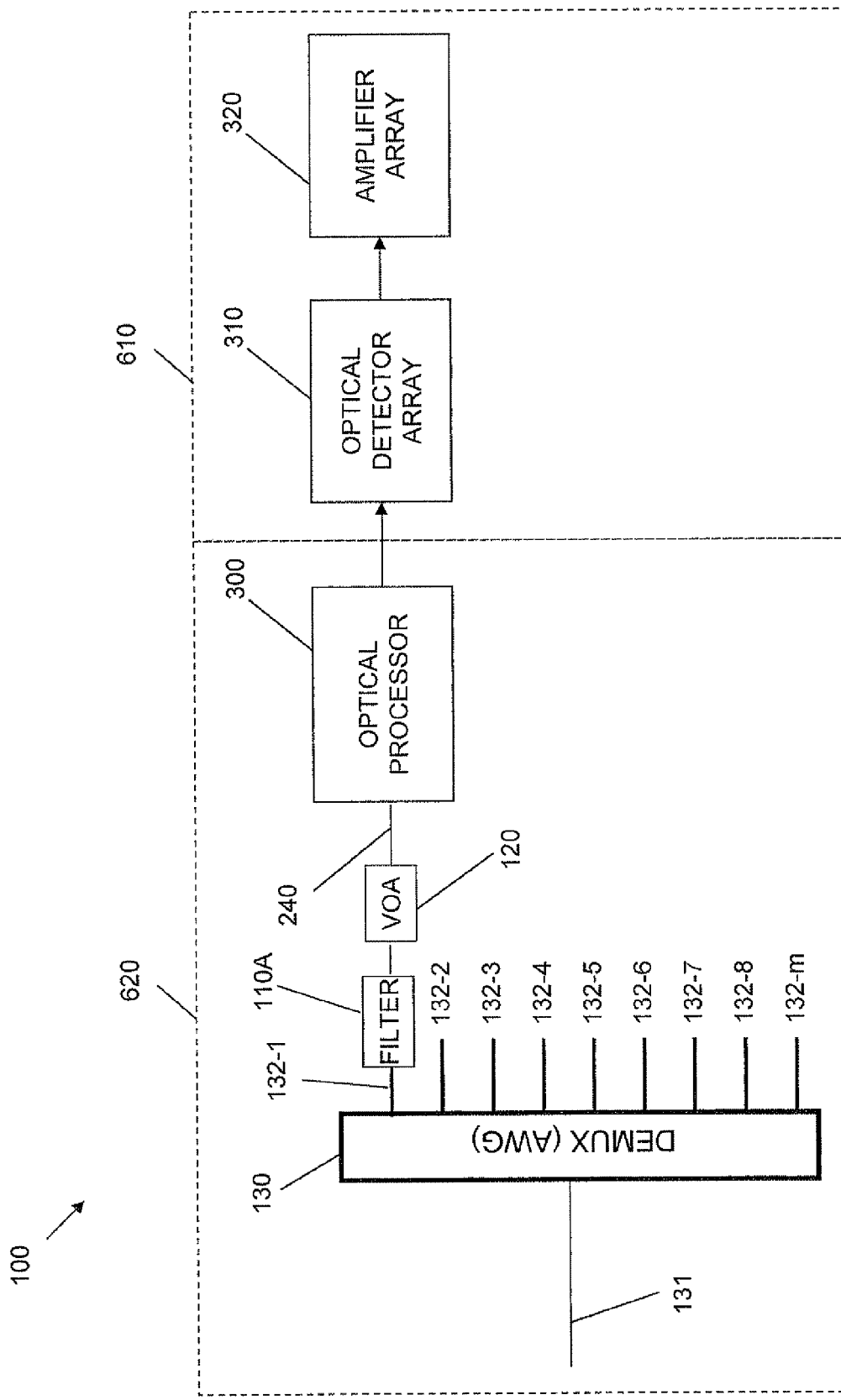
FIG. 1A illustrates exemplary components of an optical receiver in accordance with the present disclosure

DEMUX 130 may be, for example, an arrayed waveguide grating (AWG) configured to receive DQPSK WDM optical input signal at the input 131. DEMUX 130 separates each of the channels of the WDM optical input signal and supplies a corresponding channel at each of the DEMUX outputs 132. Each channel of the WDM optical input signal corresponds to one of the plurality of wavelengths of the WDM optical input signal. Filter 110 may be coupled before the DEMUX input 131 as shown in FIG. 1 or may be connected to each of the DEMUX outputs 132 as illustrated in FIG. 1A. If coupled to the input 131 of the DEMUX 130, the filter 110 may be a comb filter aligned to a standardized grid, such as an International Telecommunications Union (ITU) grid. If coupled to each of the DEMUX outputs 132, the filter 110A is preferably tunable to a particular channel wavelength and/or a particular bandwidth (e.g., 10 GHz) associated with a corresponding one of the DEMUX outputs 132. Filter 110 may have a narrow pass-band having a bandwidth between one half to two times the bandwidth of the WDM optical input signal. For example, if the WDM optical input signal has a bandwidth of 10 GHz, then the pass-band of the filter 110 may be between 5 GHz and 20 GHz. One skilled in the art will understand that other pass-bands for filter 110 may be implemented.

Figure 5:
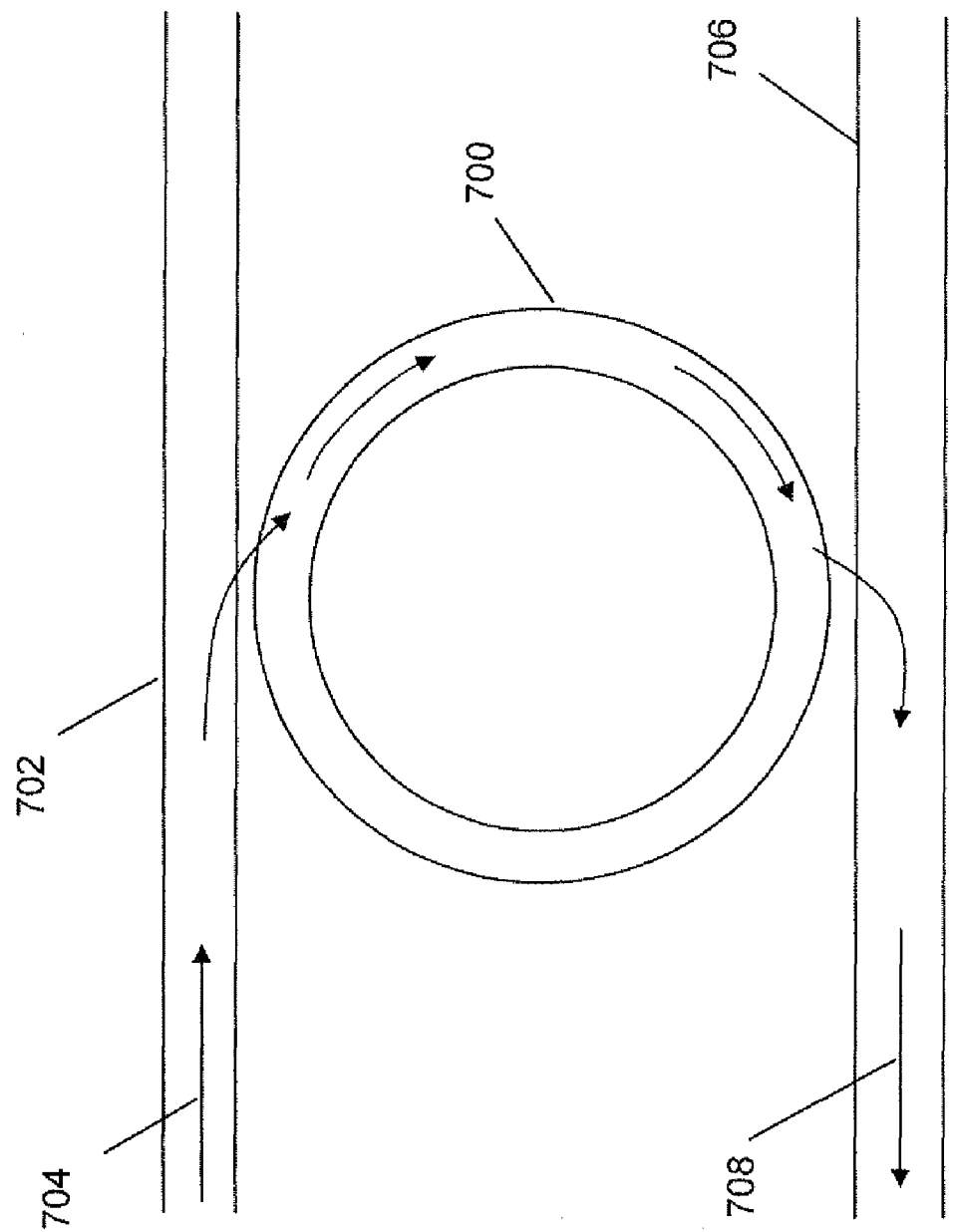
FIG. 5 illustrates the exemplary components of a ring resonator.

Tunable filters 110A (illustrated in FIG. 1A) may be implemented using ring resonators. FIG. 5 illustrates one example of a ring resonator 700 which may be used to filter an optical signal 704. Ring resonator 700 is shown disposed adjacent to a first waveguide 702 that carries the incoming optical input signal 704 and a second waveguide 706 that carries a filtered optical signal 708. The optical input signal 704 will travel along waveguide 702 and be evanescently coupled to the ring resonator 700. The physical dimensions of the ring resonator 700, such as the diameter and refractive index, filter the incoming optical signal by various wavelengths of the optical signal constructively and destructively interfering with one another. The filtered signal 708 is coupled into the second waveguide 706. Accordingly, filter 110A may be implemented using a plurality of ring resonators 700 to filter the incoming optical signal.

As further shown in FIG. 1, a variable optical attenuator (VOA) 120 may also be coupled to each DEMUX output 132 to individually vary the intensity of each channel. Each optical channel or optical signal 240 is fed to a corresponding optical processor 300. Alternatively, VOA 120 may be provided at the input 131 of DEMUX 130 to collectively adjust the intensity of the channels input to the DEMUX 130. VOA 120, whether positioned at the DEMUX outputs 132 or the input 131 of the DEMUX 131, can increase the dynamic range of receiver 100. VOA 120 may include a Mach-Zehnder interferometer having an input splitter, a pair of waveguide branches, and an output combiner. The waveguide branches may be configured as an interferometer where one of the waveguide branches has a thermo-optic heater which varies the phase of the waveguide branch and subsequently the attenuation at the output of the combiner.

Figure 2:
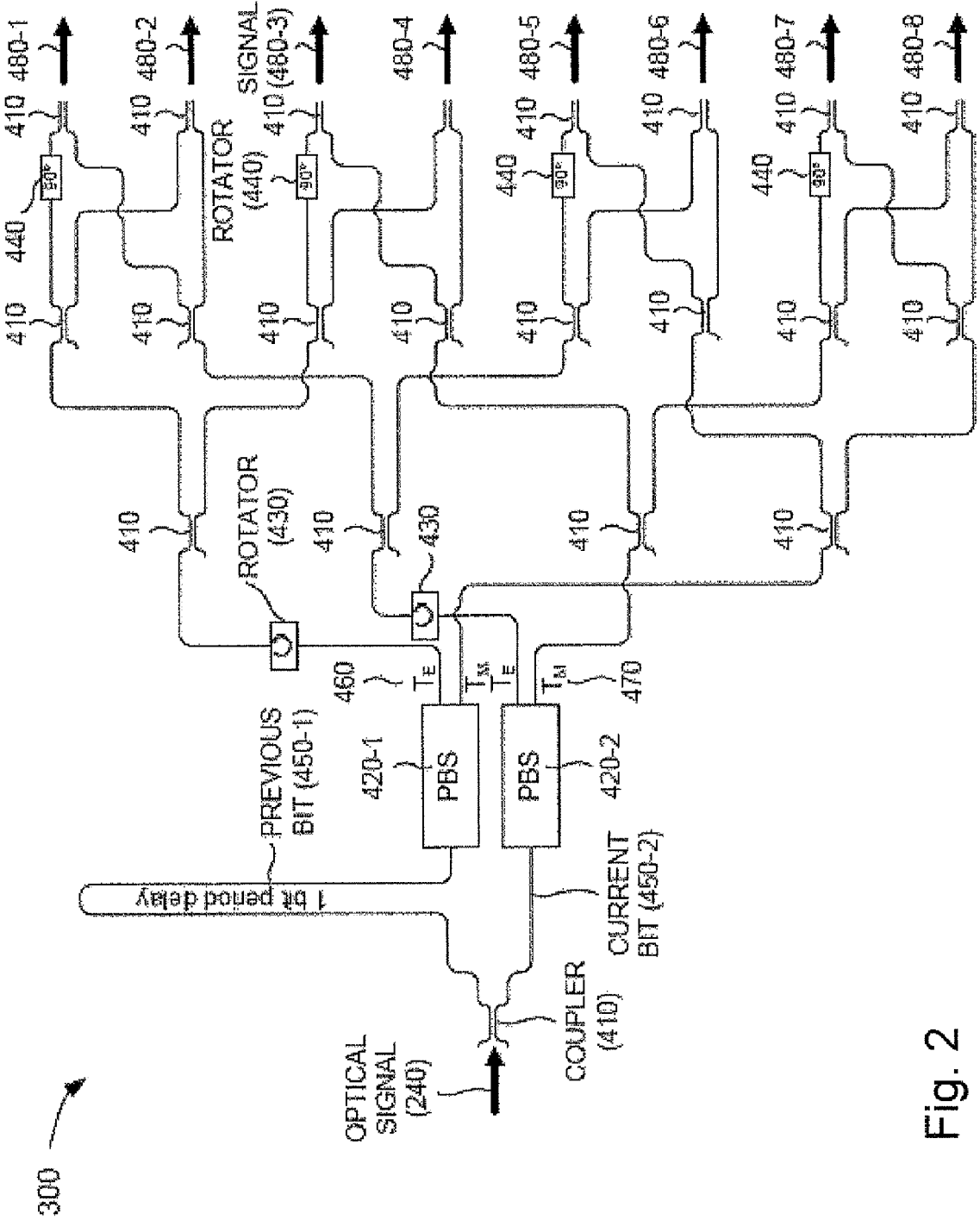
FIG. 2 illustrates a diagram of an optical processor of the optical receiver illustrated in FIG. 1.

FIG. 2 illustrates exemplary components of optical processor 300. As shown in FIG. 2, an optical signal 240 corresponding to one of the plurality of channels of the WDM optical input signal is received at a coupler 410. Coupler 410 splits the optical input signal 240 into a current bit 450-2 a previous bit 450-1. The bit delay of the previous bit 450-1 may be realized with an interferometer. In some embodiments, the interferometer may be a waveguide having a length that corresponds to a one-bit period delay of the optical signal 240. In other implementations, the bit-delay interferometer may be provided before an optical waveguide that connects the DEMUX 130 to the optical processor 300. The previous bit 450-1 and the current bit 450-2 are respectively received at a first polarization splitter (PBS) 420-1 and a second PBS 420-2 (collectively referred to as "polarization beam splitters 420" and singularly as "polarization beam splitter 420"). Each polarization beam splitter 420 may include an optical device that splits a received optical signal into two optical signals of differing polarization. In one implementation, for example, polarization beam splitter 420-1 may receive previous bit optical signal 450-1, and may split previous bit optical signal 450-1 into two optical signals of differing polarization (e.g., a first transverse electrical ($T_E$) optical signal 460 and a first transverse magnetic ($T_M$) optical signal 470). Similarly, polarization beam splitter 420-2 may receive current bit optical signal 450-2, and may split current bit optical signal 450-2 into two optical signals of differing polarization (e.g., a second transverse electrical optical signal 460 and a second transverse magnetic optical signal 470).

Optical processor 300 may include multiple couplers 410, polarization rotators 430, and optical phase shifters 440 that function to demodulate the DQPSK channel (e.g., optical signal 240) into a plurality of demodulated signal components 480-1 to 480-8 as described below. Each of the couplers 410 may include an optical device configured to split optical signals into multiple paths or combine multiple optical signals into a single path. In one implementation, for example, each coupler 410 may include an optical splitter (e.g., an optical device that splits an optical signal into multiple paths of optical signals), a WDM (e.g., an optical device that permits two or more different wavelengths of optical signals to be split into multiple paths or combined onto a single path), a fused fiber coupler, a coupler integrated into a PLC, or the like.

Each of the polarization rotators 430 may include an optical device that rotates a polarization plane of an optical signal (e.g., a particular number of degrees) as the optical signal passes through the device. In one implementation, each of the polarization rotators 430 may rotate a polarization plane of an optical signal ninety (90) degrees as the optical signal passes through polarization rotator 430. In one exemplary implementation, a think polymer half-wave plate is inserted into a slot cut into a waveguide on the PLC (substrate). U.S. Pat. No. 7,373,042 issued to Little and titled "Polarization Sorter" incorporated by reference herein in its entirety describes such a polarization rotator 430. Each of the optical phase shifters 440 may include an optical device that shifts the phase of an optical signal as the optical signal passes through the device.

In one implementation, each of the optical phase shifters 440 may phase-shift the optical signal ninety (90) degrees as the optical signal passes through each phase shifter 440.

In operation and as further shown in FIG. 2, optical signal 240 (e.g., which may be provided in a DQPSK modulated form from DEMUX 130) may be demodulated and/or demultiplexed by the arrangement of optical processor 300. Furthermore, first and second transverse electrical optical signals 460 and first and second transverse magnetic optical signals 470 may be optically split (e.g., via couplers 410), rotated (e.g., via polarization rotators 430), and/or phase shifted (e.g., via phase shifters 440) in order to produce multiple mixed optical signal pairs (e.g., signal pairs 480-1, . . . , 480-8). Optical processor 300 may provide the multiple mixed optical signal pairs (e.g., signal pairs 480-1, . . . , 480-8) to optical detector array 310 for further processing. Although FIG. 2 shows exemplary components of optical processor 300, in other implementations, optical processor 300 may contain fewer, different, or additional components than depicted in FIG. 2. In still other implementations, one or more components of optical processor 300 may perform one or more other tasks described as being performed by one or more other components of optical processor 300.

The components of optical processor 300, as well as DEMUX 130, filter 110, and VOA 120 are provided on a single substrate 620. Examples of materials for the substrate include, but are not limited to, silicon, a glass-based material, or the like. Combining the DEMUX 130, filter 110, and optical processor 300 (e.g., the passive components) on a single substrate advantageously reduces the manufacturing cost associated with the optical receiver. Additionally, forming the passive components on a single substrate reduces signal loss due to aligning passive components disposed on multiple substrates.

Figure 3:
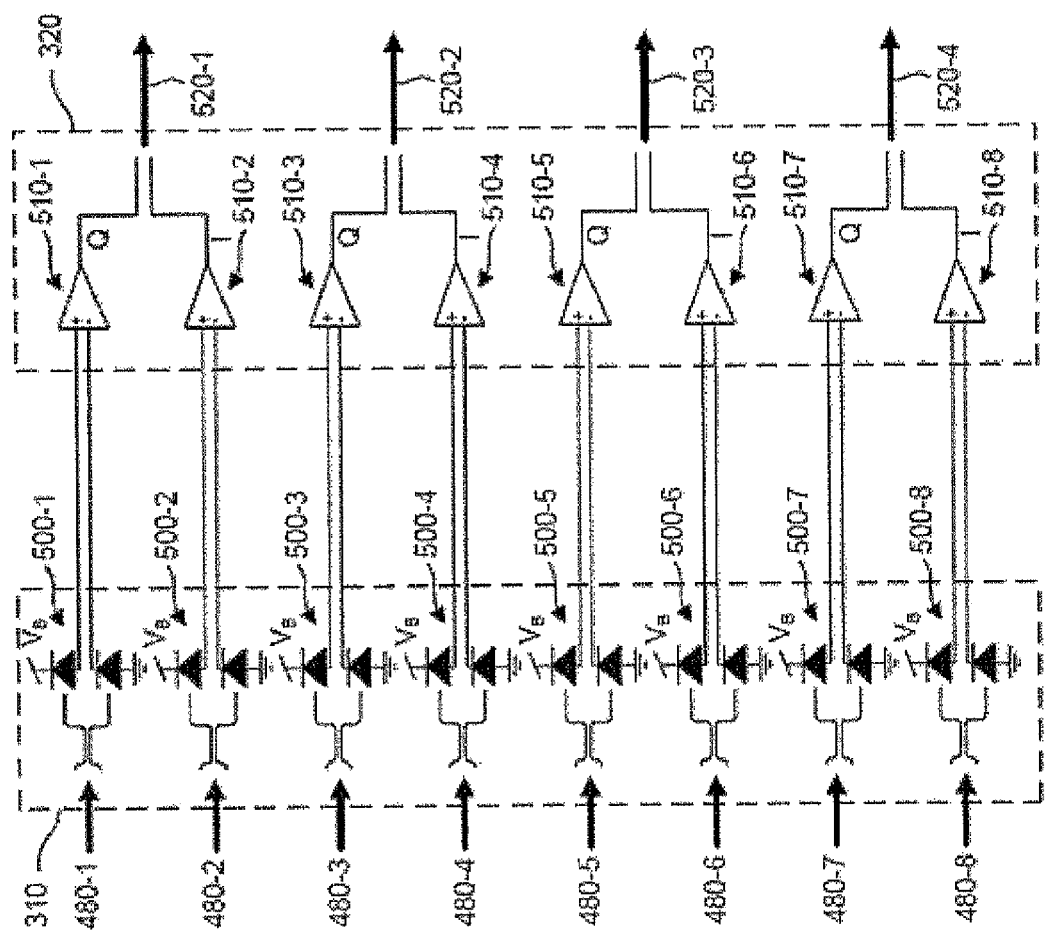
FIG. 3 illustrates a diagram of exemplary components of an optical detector array and a differential amplifier array of the optical receiver illustrated in FIG. 1.

FIG. 3 depicts a diagram of exemplary components of the optical detector array 310 and the differential transimpedance amplifier array 320 as well as the interrelationship among these exemplary components that are formed on a second substrate 610. As illustrated in FIG. 3, optical detector array 310 may include an array of one or more optical detector pairs 500-1, . . . , 500-8 (collectively referred to as "optical detector pairs 500" and singularly as "optical detector pair 500"). A differential transimpedance amplifier array 320 may be in signal communication with the optical detector pairs 500 and may include an array of one or more differential transimpedance amplifiers 510-1, . . . , 510-8 (collectively referred to as "differential amplifiers 510" and singularly as "differential amplifier 510").

Optical detector pair 500 may include a pair of optical detectors configured to convert one or more optical signals into one or more electrical signals. The optical detector pairs may convert the optical signals into electrical signals by generating an electrical voltage or current proportional to an intensity of incident optical radiation. In one exemplary embodiment, each optical detector of optical detector pair 500 may include a photodiode, such as a semiconductor positive-intrinsic-negative (PIN) photodiode, an avalanche photodiode (APD), or the like. In one implementation, optical detector pair 500 may receive a corresponding one of mixed optical signal pairs (e.g., a corresponding one of signal pairs 480-1, . . . , 480-8) from the first waveguide array 140 disposed on the first substrate 610, convert the corresponding mixed optical signal pair into a mixed electrical signal pair, and provide the mixed electrical signal pair to a corresponding one of differential amplifiers 510 (e.g., of differential transimpedance amplifier array 320). For example, optical detector pair 500-1 may receive signal pair 480-1 (e.g., from optical processor 300 by way of first waveguide array 140), convert signal pair 480-1 into a mixed electrical signal pair, and provide the mixed electrical signal pair to differential amplifier 510-1.

Differential amplifier 510 may include a device that may receive mixed electrical signals from a corresponding optical detector pair 500 (e.g., provided by optical detector array 310) and multiply a difference between the two inputs (e.g., mixed electrical signals) by a constant factor (e.g., a differential gain). Differential amplifier may output a signal (e.g., an in-phase (I) signal or a quadrature-phase (Q) signal) based on the received mixed electrical signals. For example, differential amplifier 510-1 may receive a mixed electrical signal pair from optical detector pair 500-1 and output a quadrature-phase (Q) signal based on the received mixed electrical signal pair. Differential amplifier 510-2 may receive a mixed electrical signal pair from optical detector pair 500-2 and output an in-phase (I) signal based on the received mixed electrical signal pair.

The two electrical signals can be described as carrying the quadrature-phase (Q) signal and the in-phase (I) components of the complex value of the change in optical phase between two sequential bits. The resulting signal may be combined (e.g., via an optical coupler) to produce a complex signal 520-1 (e.g., a mixed electrical signal pair) for output to a signal processor (not shown). Similarly, differential amplifiers 510-3 and 510-4 may produce a complex signal 520-2, differential amplifiers 510-5 and 510-6 may produce a complex signal 520-3, and differential amplifiers 510-7 and 510-8 may produce a complex signal 520-4 for output to a signal processor (not shown).

Although FIG. 3 shows exemplary components of optical detector array 310 and differential transimpedance amplifier array 320, in other implementations, optical detector array 310 and/or differential transimpedance amplifier array 320 may contain fewer, different, or additional components than depicted in FIG. 3. In still other implementations, one or more components of optical detector array 310 and/or differential transimpedance amplifier array 320 may perform one or more other tasks described as being performed by one or more other components of optical detector array 310 and/or differential transimpedance amplifier array 320. In still other implementations, differential transimpedance amplifier array 320 may be replaced with single-ended transimpedance amplifiers if a current sum were performed at optical detector array 320 instead of at differential transimpedance amplifier array 320.

Preferably, photodiode array 310 is made of a material capable of detecting light in the telecommunication fiber wavelength range of 1.3 to 1.6 um. Examples of such materials include, but are not limited to, Group III-V semiconductors such as indium phosphide (InP), Si—Ge, Ge, Group IV semiconductors, or the like. The material system and substrate used for detectors is different than the silicon substrate, upon which the PLCs discussed above (i.e., the optical processor, DEMUX 130, filter 110, VOA 120, and first waveguide array 140) are typically provided.

Different configurations for integrating these two substrates will be described below with reference to FIGS. 4A to 4D. Any reference to Group III-V or InP here would also be applicable to materials with similar capability such as SiGe, Ge or other materials with capability of light detection in the 1.3 to 1.6 um wavelength. By way of background, a receiver configured to receive advanced phase modulated signals requires several optical functions including routing, filtering, polarization control, attenuation and interferometric detection to demodulate the phase of the incoming light. Integrated photonics can realize these functions on a single platform that is preferably robust, small, low cost and able to deliver the passive optical functions listed above in addition to detection of high-speed optical signals. Also, multi-channel operation requires multiple detectors and optical circuits wherein cost and size become increasingly more important.

The InP semiconductor platform as used in large scale photonic integrated circuits (PIC) can, in principle, provide all the above functions including detection, but at the cost of large chip real-estate and increased losses or in some cases inferior performance for some of the optical functions. On the other hand, glass-based PLCs integrated on a silicon substrate have lower loss and can provide excellent optical performance. However, the PLC platform is unable to detect light due to material properties of Si (e.g., the indirect bandgap). Various schemes for hybrid integration of a Group III-V substrate (including the photodiode array 310) and a silicon substrate including the optical processor 300, filter 110, VOA 120, and DEMUX 130 will next be described with reference to FIGS. 4A to 4D.

FIG. 4A illustrates one exemplary connection of a first substrate 620 including the passive components (e.g., filter 110, VOA 120, DEMUX 130, and the first waveguide array 140) and a second substrate 610 including the optical detector array 310 and the amplifier array 320. In the connection, second substrate 610 includes a second waveguide array 330 disposed on a bottom surface of the second substrate 610. The alignment and spacing between the two substrates 610, 620 is controlled to provide evanescent coupling of optical signals 480-1 to 480-8 from the first waveguide array 140 disposed on the first substrate 620 to the second waveguide array 330 disposed on the second substrate 610. The optical signals 480-1 to 480-8 evanescently coupled to the second waveguide array 330 are received by the photodetector array 310 disposed on the second substrate 610. Note that although the second waveguide array 330 is illustrated in FIG. 4A as extending to the edge of the second substrate 610, in some embodiments it may second waveguide array 330 may be disposed such that it does not extend to an edge of the second substrate 610. A high-speed electrical output from photodetector array 310 may be routed to the top of substrate 620.

FIG. 4B illustrates another exemplary coupling between the first substrate 620 and the second substrate 610. As shown in FIG. 4B, a butt-coupling 630 is formed between substrates 610 and 620. In this example, a first waveguide array 140 formed on the first substrate 620 extend to an edge of the first substrate 620. A second waveguide array 330 formed on the second substrate 610 extend to an edge of the second substrate 610. The first and second substrates 620, 610 are aligned and joined so that the first and second waveguide arrays 140, 330 are in signal communication with each other. Accordingly, the first waveguide array 140 carries optical signals 480-1 to 480-8 to the second waveguide array 330, which then carries the optical signals (e.g., demodulated signal components 480-1 to 4808) to photodetectors 500-1 to 500-8 of the photodetector array 310 (see FIGS. 2 and 3).

Figure 4C:
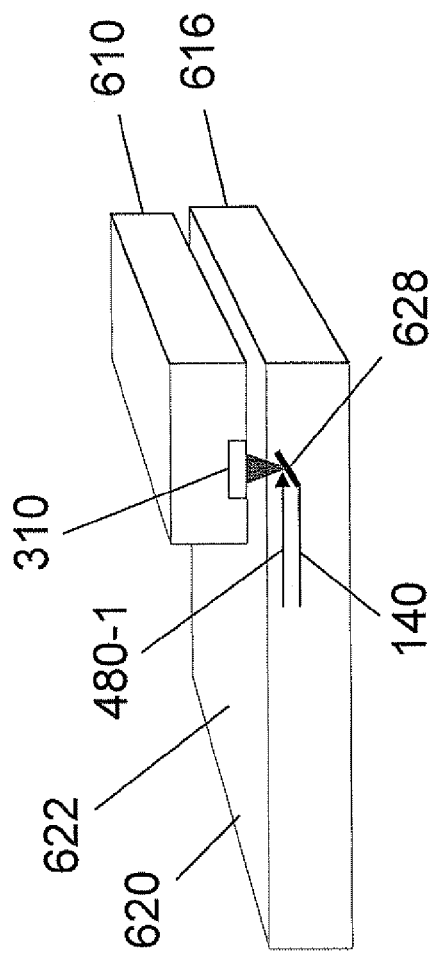
FIG. 4C illustrates yet another exemplary interface connection of a planar lightwave circuit and a photonic integrated circuit in accordance with the present disclosure.

FIG. 4C illustrates another exemplary coupling between a between a first substrate 620 and a second substrate 610. As shown in FIG. 4C, optical signals 480-1 to 480-8 (only signal 480-1 is shown for ease of illustration) are directed in a direction that is substantially normal to surface 622 of substrate 620. Photodetector array 310 is positioned on opposing surface 616 of substrate 610 in order to receive optical signals 480-1 to 480-n. In the example shown in FIG. 4C, the first waveguide array 140 disposed on substrate 620 may terminate at out-coupling mirrors 628 (90 degrees). Out-coupling mirrors 628 may include an etched structure or grating-assisted coupler. First waveguide array 140 disposed on substrate 620 may carry optical signals 480-1 to 480-8 to out-coupling mirrors 628 that direct the optical signals 480 from the top surface 622 of substrate 620 to the photodiode array 310 disposed on a surface of substrate 610. In some embodiments, the electrical signals generated by the photodiode array 310 may be routed from the photodiode array 310 to the top surface 622 of substrate 620. Substrate 610 which includes photodiode array 310 may be flip-chip bonded or glued to substrate 620.

Figure 4D:
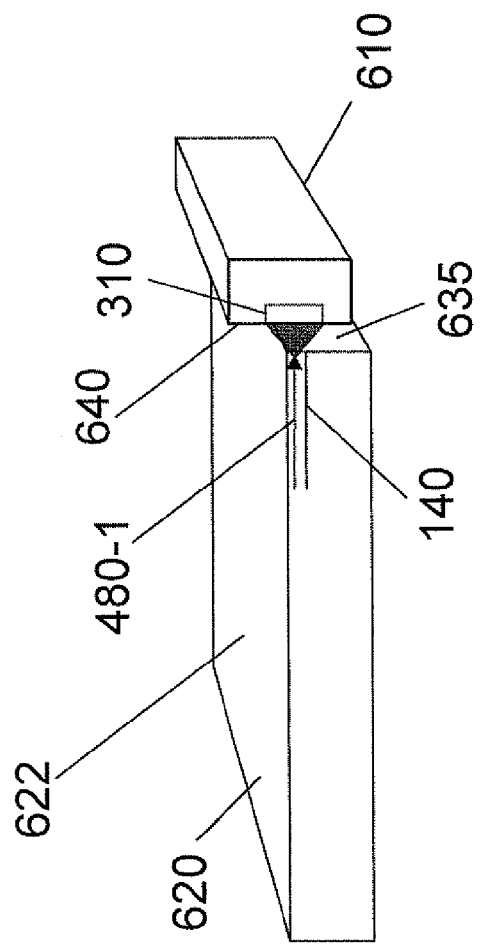
FIG. 4D illustrates yet another exemplary interface connection of a planar lightwave circuit and a photonic integrated circuit in accordance with the present disclosure.

FIG. 4D shows an edge-coupled scheme that employs surface normal and larger area detectors as opposed to the waveguide detectors shown in FIG. 4B. In particular, optical signals 480-1 to 480-8 (for ease of illustration only signal 480-1 is shown in FIG. 4D) are emitted from edge surface 635 of substrate 620. Photodiode array 310 may be provided on surface 640 of substrate 610. Surface 640 may be oriented parallel to edge surface 635 and perpendicular to surface 622 of substrate 620. Preferably, photodiode array 310 is positioned so that it receives optical signals 480-1 to 480-8 from first waveguide array 140 disposed on substrate 620.

Photodiodes 500-1 to 500-8 (see FIG. 3) may either be arranged linearly or in an N×M matrix or array, where N is greater than 1. In general, a larger N will help to minimize the aspect ratio of the array and improve mechanical properties. In addition, the photodiode array 310 may be laid out non-uniformly (e.g. in a non-rectangular grid) to minimize the PLC chip size or improve routing of the optical signals.

While the present invention has been disclosed with reference to certain embodiments, numerous modifications, alterations and changes to the described embodiments are possible without departing from the sphere and scope of the present invention, as defined in the appended claims. Accordingly, it is intended that the present invention not be limited to the described embodiments, but that it has the full scope defined by the language of the following claims, and equivalents thereof.

What is claimed is:

1. An optical receiver, comprising:
a first substrate;
a demultiplexer disposed on the first substrate, the demultiplexer having an input and a plurality of outputs, the input configured to receive a wavelength division multiplexed (wdm) optical input signal having a plurality of channels, each of said plurality of channels corresponding to one of a plurality of wavelengths, each of the plurality of outputs configured to supply a corresponding one of said plurality of channels;
a first optical waveguide array disposed on the first substrate, said first optical waveguide array having a plurality of inputs, each of said inputs of the first optical waveguide array configured to receive a corresponding one of said plurality of channels;
a second substrate; and
an optical detector array disposed on the second substrate, the second substrate being in signal communication with the first substrate, the optical detector array having a plurality of inputs, each of which is configured to receive a corresponding one of said plurality of channels and generate an electrical signal in response thereto,
wherein the first substrate further includes:
a mirror disposed at an end of each waveguide of the first waveguide array, the mirror configured to redirect an optical signal received from the optical processor to the optical detector array disposed on the second substrate.

2. The optical receiver of claim 1, wherein the first substrate is a silicon substrate.

3. The optical receiver of claim 1, wherein the second substrate is one of a group III-V substrate or a group IV substrate.

4. The optical receiver of claim 1, wherein the optical detector array is disposed on a surface of the second substrate.

5. The optical receiver of claim 4, wherein the surface of the second substrate on which the optical detector is disposed is joined to an edge of the first substrate.

6. The optical receiver of claim 1, wherein each of the plurality channels is modulated in accordance with a differential quadrature phase-shift keyed (dqpsk) format.

7. The optical receiver of claim 1, wherein the second substrate further includes:
a second waveguide array connected to the optical detector, the second waveguide array extending from an edge surface of the second substrate and configured to receive the plurality of channels from the first waveguide array disposed on the first substrate.

8. The optical receiver of claim 1, further comprising:
a plurality of variable optical attenuators (VOAs), each of which being coupled to a corresponding one of the plurality of outputs of the demultiplexer, each of the plurality of VOAs being configured to vary an intensity of a corresponding one of the plurality of optical channels.

9. The optical receiver of claim 8, wherein the demultiplexer is an arrayed waveguide grating (AWG).

10. An optical receiver,
a first substrate;
a demultiplexer disposed on the first substrate, the demultiplexer having an input and a plurality of outputs, the input configured to receive a wavelength division multiplexed (wdm) optical input signal having a plurality of channels, each of said plurality of channels corresponding to one of a plurality of wavelengths, each of the plurality of outputs configured to supply a corresponding one of said plurality of channels:
a first optical waveguide array disposed on the first substrate, said first optical waveguide array having a plurality of inputs, each of said inputs of the first optical waveguide array configured to receive a corresponding one of said plurality of channels;
a second substrate;
an optical detector array disposed on the second substrate, the second substrate being in signal communication with the first substrate, the optical detector array having a plurality of inputs, each of which is configured to receive a corresponding one of said plurality of channels and generate an electrical signal in response thereto; and
an optical processor disposed on the first substrate and in signal communication with the demultiplexer, the optical processor configured to receive one of said plurality of channels from a corresponding one of the plurality of outputs of the demultiplexer and output a plurality of optical channel components to the first optical waveguide array, wherein the optical processor includes:
a plurality of beam splitters configured to split one of the plurality of channels into the plurality of optical channel components; and
a plurality of phase shifters and polarization rotators connected to the plurality of beam splitters, the plurality of phase shifters and polarization rotators configured to adjust the phase and polarization of the optical signal components.

11. The optical receiver of claim 10, wherein the first substrate is a silicon substrate.

12. The optical receiver of claim 10, wherein the second substrate is one of a group iii-v substrate or a group iv substrate.

13. The optical receiver of claim 10, wherein the optical detector array is disposed on a surface of the second substrate.

14. The optical receiver of claim 13, wherein the surface of the second substrate on which the optical detector is disposed is joined to an edge of the first substrate.

15. The optical receiver of claim 10, wherein the first substrate further includes:
a mirror disposed at an end of each waveguide of the first waveguide array, the mirror configured to redirect an optical signal received from the optical processor to the optical detector array disposed on the second substrate.

16. The optical receiver of claim 10, wherein each of the plurality channels is modulated in accordance with a differential quadrature phase-shift keyed (DQPSK) format.

17. The optical receiver of claim 10, wherein the second substrate further includes:
a second waveguide array connected to the optical detector, the second waveguide array extending from an edge surface of the second substrate and configured to receive the plurality of channels from the first waveguide array disposed on the first substrate.

18. The optical receiver of claim 10, further comprising:
a plurality of variable optical attenuators (voas), each of which being coupled to a corresponding one of the plurality of outputs of the demultiplexer, each of the plurality of voas being configured to vary an intensity of a corresponding one of the plurality of optical channels.

19. An optical receiver, comprising:
a first substrate;
a first planar lightwave circuit (plc) formed on the first substrate, the plc including:
a demultiplexer configured to receive a wave division multiplexed (wdm) optical input signal having a plurality of channels and supply a plurality of optical output signals, each of the plurality of output signals corresponding to one of the plurality channels of the wdm optical input signal, each of the plurality of channels corresponding to one of a plurality of wavelengths;
a first optical waveguide array having a plurality of inputs and outputs, each of the plurality of inputs of the first optical waveguide array is configured to receive at least an optical signal component of one of the plurality of channels;
a second substrate;
an optical detector array disposed on the second substrate, the optical detector array including:
a plurality of photodiodes, each of the plurality of photodiodes configured to receive an optical signal component from a respective waveguide of the first optical waveguide array and generate an electrical signal in response thereto; and
a second optical waveguide array including a plurality of optical waveguides provided on the second substrate, each of the optical waveguides of the second optical waveguide array configured to receive a respective signal component of one of the plurality of channels from a respective waveguide of the first plurality of waveguides,
wherein the first optical waveguide array is disposed on a surface of the first substrate, the second optical waveguide array is disposed on a surface of the second substrate, and the first and second substrates are aligned such that the first and second waveguide arrays are in signal communication with each other.

20. The optical receiver of claim 19, wherein the first optical waveguide array extends to an edge of the first substrate, the second optical waveguide array extends to an edge of the second substrate.

21. The optical receiver of claim 19, wherein the first substrate further includes:
a plurality of mirrors, each of the plurality of mirrors connected to corresponding one of the outputs of the first optical waveguide array, the plurality of mirrors configured to receive each of said signal components and reflect the signal components to the optical detector array.

22. The optical receiver of claim 19, wherein the first optical waveguide array extends to an edge of the first substrate and the plurality of photodiodes are disposed on the surface of the second substrate and are in signal communication with the first waveguide array.

23. The optical receiver of claim 19, wherein each of the plurality channels is modulated in accordance with a differential quadrature phase-shift keyed DQPSK format.

24. The optical receiver of claim 19, wherein the first substrate is a silicon substrate.

25. The optical receiver of claim 19, wherein the second substrate is one of a group III-V substrate or a group IV substrate.

26. The optical receiver of claim 19, further comprising:
a plurality of variable optical attenuators (VOAs), each of which being coupled to a corresponding one of the plurality of outputs of the demultiplexer, each of the plurality of VOAs being configured to vary an intensity of a corresponding one of the plurality of optical channels.

27. An optical receiver, comprising:
a first substrate;
a first planar lightwave circuit (PLC) formed on the first substrate, the PLC including:
a demultiplexer configured to receive a wave division multiplexed (wdm) optical input signal having a plurality of channels and supply a plurality of optical output signals, each of the plurality of output signals corresponding to one of the plurality channels of the wdm optical input signal, each of the plurality of channels corresponding to one of a plurality of wavelengths;
a first optical wavequide array having a plurality of inputs and outputs, each of the plurality of inputs of the first optical waveguide array is configured to receive at least an optical signal component of one of the plurality of channels;
a second substrate;
an optical detector array disposed on the second substrate, the optical detector array including:
a plurality of photodiodes, each of the plurality of photodiodes configured to receive an optical signal component from a respective waveguide of the first optical waveguide array and generate an electrical signal in response thereto; and
an optical processor disposed on the first substrate and in signal communication with the demultiplexer, the optical processor configured to receive one of said plurality of channels from a corresponding one of the plurality of outputs of the demultiplexer and to output a plurality of optical channel components to the first optical waveguide array wherein the optical processor includes:
a plurality of beam splitters configured to split one of the plurality of channels into the plurality of optical channel components; and
a plurality of phase shifters and polarization rotators connected to the plurality of beam splitters, the plurality of phase shifters and polarization rotators configured to adjust the phase and polarization of the optical signal components.

28. The optical receiver of claim 27, further including:
a second optical waveguide array including a plurality of optical waveguides provided on the second substrate, each of the optical waveguides of the second optical waveguide array configured to receive a respective signal component of one of the plurality of channels from a respective waveguide of the first plurality of waveguides.

29. The optical receiver of claim 27, wherein the first optical waveguide array is disposed on a surface of the first substrate, the second optical waveguide array is disposed on a surface of the second substrate, and the first and second substrates are aligned such that the first and second waveguide arrays are in signal communication with each other.

30. The optical receiver of claim 27, wherein the first optical waveguide array extends to an edge of the first substrate, the second optical waveguide array extends to an edge of the second substrate, and the first and second substrates are joined such that the first and second optical waveguide arrays are in signal communication with each other.

31. The optical receiver of claim 27, wherein the first substrate further includes:
a plurality of mirrors, each of the plurality of mirrors connected to corresponding one of the outputs of the first optical waveguide array, the plurality of mirrors configured to receive each of said signal components and reflect the signal components to the optical detector array.

32. The optical receiver of claim 27, wherein the first optical waveguide array extends to an edge of the first substrate and the plurality of photodiodes are disposed on a surface of the second substrate and are in signal communication with the first waveguide array.

33. The optical receiver of claim 27, wherein each of the plurality channels is modulated in accordance with a differential quadrature phase-shift keyed DQPSK format.

34. The optical receiver of claim 27, wherein the first substrate is a silicon substrate.

35. The optical receiver of claim 27, wherein the second substrate is one of a group III-V substrate or a group IV substrate.

36. The optical receiver of claim 27, further comprising:
a plurality of variable optical attenuators (VOAs), each of which being coupled to a corresponding one of the plurality of outputs of the demultiplexer, each of the plurality of VOAs being configured to vary an intensity of a corresponding one of the plurality of optical channels.

37. The optical receiver of claim 27, wherein the demultiplexer is an arrayed waveguide grating (AWG).

* * * * *